Oct. 7, 1952     G. G. THOMPSON ET AL     2,613,342
DYNAMIC BRAKING CIRCUITS FOR ELECTRIC MOTORS
Filed Nov. 2, 1949
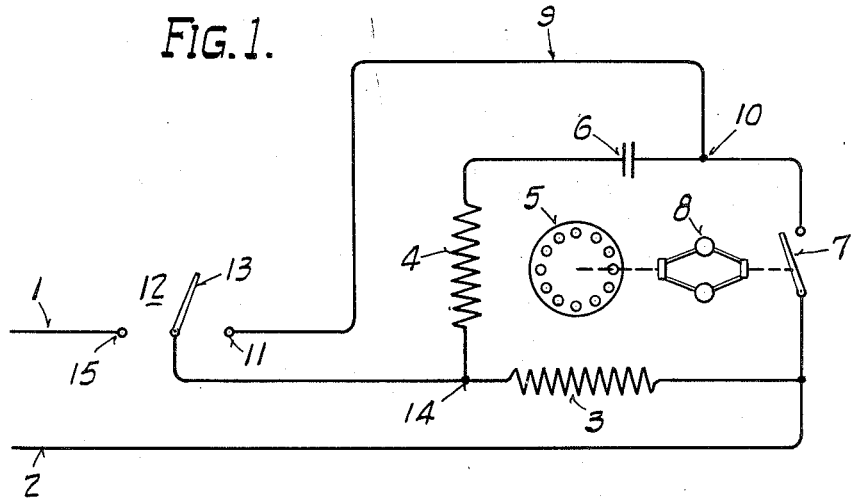
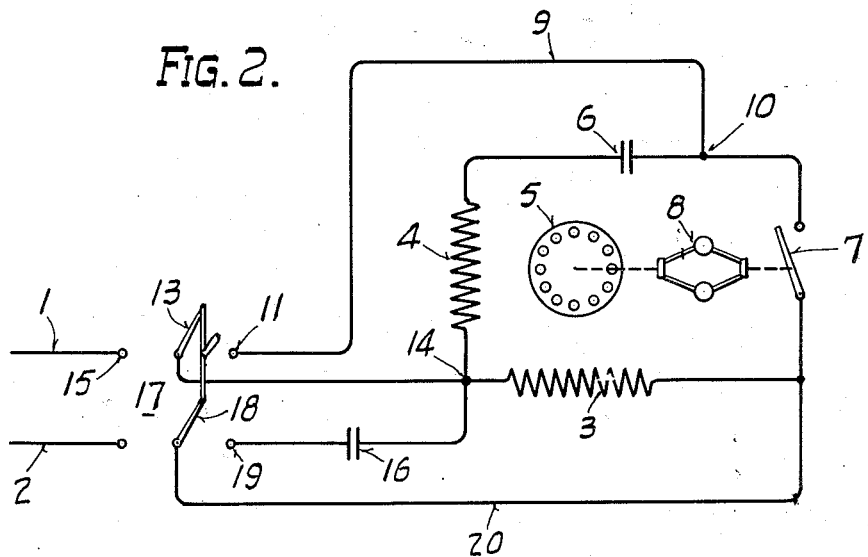
George G. Thompson
Arthur J. Vail
INVENTORS.
BY Andrus & Sceales
ATTORNEYS.

Patented Oct. 7, 1952

2,613,342

UNITED STATES PATENT OFFICE 2,613,342

DYNAMIC BRAKING CIRCUITS FOR ELECTRIC MOTORS

George G. Thompson, Pasadena, and Arthur J. Vail, Altadena, Calif., assignors to A. O. Smith Corporation, Milwaukee, Wis., a corporation of New York Application November 2, 1949, Serial No. 125,104

13 Claims. (Cl. 318—211)

This invention relates to improvements in dynamic braking circuits for electric motors.

The invention is particularly related to capacitor start single phase induction motors such as are used to drive small lathes and the like.

A principal object of the present invention is to provide an improved method of dynamically breaking and stopping an electric motor.

Another object of the invention is to provide for the dynamic braking of an ordinary capacitor start single phase induction motor by merely adding a single lead and terminal, thereby allowing dynamic braking to be achieved at a very low cost.

Another object of the invention is to provide a means for quickly stopping electric motors such as are used to drive small lathes or other small machine tools.

These and other objects and advantages of the invention will be set forth more fully in the following description of embodiments of the invention as illustrated in the accompanying drawings.

In the drawings:

Figure 1 is a schematic diagram of a simple form of the invention; and

Fig. 2 is a modification of the invention in which an additional capacitor and switch are utilized.

The invention is shown in the drawings as applied to a capacitor start single phase induction motor adapted to be connected to supply lines 1 and 2, and having a main winding 3, a starting winding 4, and a squirrel cage rotor 5. When the motor is switched to running position, the main winding 3 is connected across lines 1 and 2 in parallel with a starting circuit. The starting circuit comprises, in addition to the starting winding 4, a capacitor 6 and an automatic switch 7. Although the following description is based on the assumption that the capacitor 6 is located, as shown in the drawings, between the starting winding 4 and the automatic switch 7, the locations of the starting winding 4 and the capacitor 6 may be reversed without changing the invention. The automatic switch 7 is actuated by a speed responsive centrifugal device 8 to open the starting circuit when the motor has reached a suitable speed sufficient to allow it to run on the main winding 3 alone. Various other devices may be used in place of the centrifugal device 8.

Referring to Fig. 1, a braking lead 9 is used to connect a contact point 10, located between the automatic switch 7 and the adjacent capacitor 6, and the right terminal 11 of a single pole double throw switch 12. The pole 13 of switch 12 is connected to the motor terminal 14 leading to starting winding 4 and main winding 3, and the left terminal 15 of switch 12 is connected to line 1. The motor may be braked by rapidly opening the switch 12 from the left (running) position and closing it to the right (braking) position. The single pole double throw switch 12 may be replaced by a different switch, for example a drum or magnetic switch, which allows instantaneous shifting from running to braking positions and which has no "coast" position such as is present in switch 12 when it is closed to neither terminal.

The operation of the invention, as illustrated in Fig. 1, is as follows: To start the motor, switch 12 is closed to terminal 15, thereby energizing the starting circuit in parallel with the main winding 3. The motor thus starts and comes up to the speed at which the automatic switch 7 opens, de-energizing the starting circuit and causing the motor to continue to run on the main winding 3 alone.

To brake the motor, voltage induced in the windings by the flux which persists in rotor 5 for a short time after the motor is disconnected is utilized by opening switch 12 from terminal 15 and rapidly closing it to terminal 11, thereby causing current to flow through a circuit which consists of starting winding 4, capacitor 6, and braking lead 9. The relation between the capacitor 6 and winding 4 is such as to very quickly build up the voltages in the circuit with a corresponding increase in current in the winding 4. This rapid increase in current in the winding 4 will cause additional flux to be induced in the rotor 5. The inter-action of the winding current and rotor flux creates a dynamic braking effect by converting rotational mechanical energy into electrical energy. This electrical energy is dissipated within the motor in the form of heat energy and causes the motor speed to be rapidly reduced to a value at which the automatic switch 7 closes.

The closing of the automatic switch 7 creates an additional braking circuit comprising the main winding 3, switch 7, braking lead 9, and terminal 11 of switch 12. Current caused by the flux in the rotor 5, as described above, flows through this short circuit and the resulting flux interacts with the flux in rotor 5 to cause additional braking. Thus both the starting winding 4 and the main winding 3 are utilized to bring the motor rapidly to rest.

Fig. 2 illustrates a modification of the invention having an additional capacitor 16, and in which switch 12 as shown in Fig. 1 is replaced by a double pole double throw switch 17.

The upper pole 13 of switch 17 operates the same as the pole 13 of switch 12 described above. The lower pole 18 of switch 17 serves to short the main winding 3 through capacitor 16. The capacitor 16 is connected between the right lower terminal 19 of switch 17 and one side of the main winding 3, placing it in series with the main winding 3 when switch 17 is closed to terminal 19 and pole 18 is connected by means of a lead 20 to the other side of the main winding 3.

The operation of this modification is identical with the operation of the form of the invention illustrated in Fig. 1 except during the braking interval which starts when switch 17 is opened from the line and closed to terminals 11 and 19, and ends when automatic switch 7 closes. During this interval current induced into the main winding 3 by the residual rotor flux flows through a circuit which comprises the main winding 3, capacitor 16, terminal 19 of switch 17, and lead 20. This current creates a braking force which, combined with the braking force caused by the current flowing through the starting winding 4, capacitor 6, and braking lead 9, operates to retard the motor at least down to the speed at which switch 7 closes. The closing of switch 7 shorts all current flowing in the main winding 3 through braking lead 9 and terminal 11 of switch 17, which ends the utility of capacitor 16 and makes further braking action identical with that described in connection with the form of the invention illustrated by Fig. 1.

Either of the described braking arrangements may be achieved with a proper single phase capacitor start induction motor to which one terminal and one lead, which connects the one terminal to a contact point adjacent the automatic starting switch as described, have been added.

It is possible, through the use of an ordinary reversing switch, to reverse the motor after it has been stopped in the described manner. Such an arrangement would allow both quick stopping and quick reversing to be achieved.

Laboratory tests have shown that the described arrangements produce a remarkable braking effect for a motor of proper design. The following table illustrates the braking obtained when a ¾-horsepower, 4 pole, capacitor start, single phase, squirrel cage induction motor was connected according to Fig. 1. Various sizes of flywheels and starting capacitors were used.

| Size of Flywheel | Size of Starting Capacitor (mfd.) | Stopping Performance (Running Speed 1,800 R. P. M.) |
| --- | --- | --- |
| None | 324–360 | Retards to 175 R. P. M. in 12 cycles—coasts. |
|  | 432–480 | Stops in 8 cycles. |
|  | 540–600 | Stops in 7 to 8 cycles. |
|  | 645–720 | Stops in 6 to 7 cycles. |
|  | 800–916 | Stops in 5 to 6 cycles. |
| 12.6 lb. in.² | 324–360 | Retards to 400 R. P. M. in 12 cycles—coasts. |
|  | 432–480 | Stops in 8 cycles. |
|  | 540–600 | Stops in 5 to 9 cycles. |
|  | 645–720 | Stops in 5 cycles. |
|  | 800–916 | Stops in 6 cycles. |
| 25.2 lb. in.² | 324–360 | Retards to 425 R. P. M. in 14 cycles—coasts. |
|  | 432–480 | Stops in 8 cycles. |
|  | 540–600 | Stops in 8 cycles. |
|  | 645–720 | Stops in 7 cycles. |
|  | 800–916 | Stops in 6 cycles. |

Various embodiments of the invention may be employed within the scope of the following claims.

We claim:
1. In a dynamic braking arrangement adapted to be employed with a single phase motor having main and starting windings, a speed-responsive control switch for the starter winding, a capacitor, and switching means to disconnect said motor from its source of energy and substantially simultaneously short one of said windings through said capacitor independently of said starter winding switch to dynamically brake said motor.

2. In a dynamic braking arrangement adapted to be employed with a single phase squirrel cage induction motor having main and starting windings, a speed-responsive control switch for the starter winding, a capacitor, a braking circuit connecting said capacitor and one of said windings in series circuit relation, and a switch connected in said braking circuit to short said one winding through said capacitor independently of said starter winding switch upon disconnection of said motor from its source of energy.

3. In a dynamic braking arrangement adapted to be employed with a single phase motor having main and starting windings and a starting capacitor, switching means to dynamically brake said motor by first disconnecting said motor from its source of current and immediately thereafter shorting only said starting winding through said starting capacitor.

4. In a dynamic braking arrangement adapted to be employed with a single phase squirrel cage induction motor having main and starting windings, a starting capacitor connected to one of said windings, a braking circuit connecting said capacitor and said one winding in series circuit relation, and a single pole double throw switch connected in said braking circuit and to the source of energy of said motor to dynamically brake said motor by disconnecting said motor from said energy source and shorting only said one winding through said starting capacitor.

5. In combination with a single phase capacitor start squirrel cage induction motor having main and starting windings and a starting capacitor, switching means to disconnect said motor from its source of energy and substantially simultaneously short said starting winding only through said starting capacitor to dynamically brake said motor.

6. In a dynamic braking arrangement adapted to be employed with a single phase motor having main and starting windings, a capacitor, and switching means to short one of said windings upon itself and the other of said windings through said capacitor upon disconnection of said motor from its source of energy.

7. In a dynamic braking arrangement adapted to be employed with a single phase motor having main and starting windings, a starting capacitor connected to shift the phase of current flowing in said starting winding with respect to the current flowing in said main winding, and switching means to dynamically brake said motor by first shorting one of said windings through said starting capacitor and immediately thereafter shorting the other of said windings upon itself, both of said shorting operations occurring upon disconnection of said motor from its source of energy.

8. In a dynamic braking arrangement adapted to be employed with a single phase motor having main and starting windings, a starting capacitor, and switching means to disconnect said motor from its source of energy and substantially simultaneously short said main winding upon itself and said starting winding through said starting capacitor to dynamically brake said motor.

9. A single phase capacitor start squirrel cage induction motor comprising a squirrel cage rotor, main and starting primary windings, a starting capacitor in series with said starting winding, an automatic switch disposed to open and close the starting circuit of said motor as it accelerates to and decelerates from running speed, respectively, and a switch disposed to dynamically brake said motor by shorting said starting winding through said starting capacitor upon disconnection of said motor from its source of energy and by separately shorting said main winding upon the closing of said automatic switch.

10. In a dynamic braking arrangement adapted to be employed with a single phase motor having main and starting windings, a pair of capacitors, and switching means to short said main winding through one of said capacitors and said starting winding through the other of said capacitors upon disconnection of said motor from its source of energy.

11. In a dynamic braking arrangement adapted to be employed with a single phase squirrel cage induction motor having main and starting windings, a pair of capacitors, and a switch connected to short said main winding through one of said capacitors and said starting winding through the other of said capacitors, both of said shorting operations occurring upon disconnection of said motor from its source of energy.

12. A single phase capacitor start squirrel cage induction motor having a squirrel cage rotor, main and starting windings, a starting capacitor in series with said starting winding, an automatic switch disposed to open and close the starting circuit of said motor as it accelerates to and decelerates from running speed, respectively, a second capacitor, and switching means to substantially simultaneously disconnect said motor from its source of energy and dynamically brake the same by shorting said starting winding through said starting capacitor and by shorting said main winding through said second capacitor.

13. In a dynamic braking arrangement adapted to be employed with a single phase capacitor start squirrel cage induction motor having a squirrel cage rotor, main and starting windings, a starting capacitor in series with said starting winding, and an automatic switch disposed to open and close the starting circuit as the motor accelerates to and decelerates from running speed, respectively, a second capacitor, and a switch disposed to substantially simultaneously disconnect said motor from its source of energy and dynamically brake the same by shorting said starting winding through said starting capacitor, by shorting said main winding through said second capacitor, and by shorting said main winding upon itself upon closing of said automatic switch.

GEORGE G. THOMPSON.
ARTHUR J. VAIL.

REFERENCES CITED

The following references are of record in the file of this patent:

UNITED STATES PATENTS

| Number | Name | Date |
|---|---|---|
| 1,555,244 | Gazda | Sept. 29, 1925 |
| 1,754,779 | Thurston | Apr. 15, 1930 |
| 2,205,252 | Graham | June 18, 1940 |
| 2,380,270 | Suhr et al. | July 10, 1945 |
| 2,445,806 | Snyder | July 27, 1948 |
| 2,454,986 | Fuge | Nov. 30, 1948 |